Patented Dec. 12, 1939

2,183,027

UNITED STATES PATENT OFFICE 2,183,027

PROCESS OF EXTRACTING VANADIUM FROM VANADIUM-BEARING SILICATES

Bruno Mayer, Crafton, Pa., assignor to Vanadium Corporation of America, Bridgeville, Pa., a corporation of Delaware No Drawing. Application June 25, 1936, Serial No. 87,258. Renewed October 17, 1938

6 Claims. (Cl. 23—19)

This invention relates to a process of extracting vanadium from vanadium-bearing silicates, either natural or artificial silicates. The process is described herein particularly in connection with the extraction of vanadium from vanadium-bearing basic open hearth furnace slags, but may be utilized in the treatment of other slags or silicates containing suitable quantities of vanadium.

It is well known that basic open hearth slags respond very readily to attack of mineral acids. Treating the vanadium-bearing open hearth slags with sulphuric, nitric or hydrochloric acid extracts the vanadium and other constituents as compounds of iron, manganese, phosphoric acid ($P_2O_5$), aluminum, etc., in varying quantities, depending on the concentration of the acids used. The separation of the vanadium from these impurities is, however, very difficult, for example:

(1) If 100 parts of a slag ground to pass 100 mesh are leached with 550 parts concentrated sulphuric acid, 99.1% vanadium, 97.3% iron and 89% manganese of the respective amounts present in the slag are dissolved.

(2) If 100 parts of the ground slag are leached with 900 parts of a 20% sulphuric acid, 86.5% vanadium and 80% iron of the respective amounts present in the slag are dissolved.

(3) If 100 parts of the ground slag are leached with 850 parts of a 10% sulphuric acid, 10% vanadium, 56% iron and 59% manganese are dissolved.

These open hearth slags have generally a low-vanadium content, but are high in iron and manganese. The leaching solutions will, therefore, contain a very unfavorable ratio of vanadium to iron and manganese. For instance, a slag with 1.62% vanadium, 14.49% iron and 8.77% manganese will give in the solutions for:

Example #1. A ratio:

$$\frac{Fe}{V}=\frac{9}{1}; \frac{Mn}{V}=\frac{5.4}{1}$$

Example #3. A ratio:

$$\frac{Fe}{V}=\frac{50}{1}; \frac{Mn}{V}=\frac{50}{1}$$

Considerable difficulty is encountered in extracting the vanadium from such solutions.

I have discovered that by roasting the slag, prior to leaching it with acid, the solubility of iron, manganese, alumina, silica and other impurities in the leaching acid is greatly reduced, without loss of vanadium solubility and, in fact, in some cases with an actual increase in vanadium solubility. The slag is preferably ground to pass a 100 mesh screen and roasted for several hours at temperatures varying preferably from 1400 to 1800° F., the charge being rabbled and cooled in air.

Manganese, iron, aluminum, etc., are thus prevented from entering the leaching solution carrying the vanadium, for example:

200 parts of a slag roasted at 1600° F. were leached with 850 parts of 10% sulphuric acid for one hour at room temperature. The resulting leaching liquor contained 75% vanadium, 8% iron and 3.3% manganese of the respective amounts present in the slag. In this solution, the ratios were:

$$\frac{Fe}{V}=\frac{1.2}{1}; \frac{Mn}{V}=\frac{0.24}{1}$$

Solutions of this type do not present any difficulty in extracting the vanadium.

Variations in the roasting temperature within the above limits do not greatly influence the solubilities of the vanadium, iron, manganese, etc., that are obtained.

Samples of slags roasted at 1400, 1500, 1600 and 1800° F. when subjected to a leach with sulphuric acid of the same concentration do not vary greatly in the recovery of the vanadium, and show only a slight decrease in the solubility of the iron and manganese; for example, 100 parts of slag were leached for one hour at room temperature with 10% sulphuric acid, the vanadium recovery was 75% in slag heated to 1400° F., 72% in slag heated to 1500° F., 73% in slag heated to 1600° F., and 68% in slag heated to 1800° F.

The solubilities of the iron and manganese in these slags were:

Iron 8%, manganese 3.3% at 1400° F.
Iron 6.8%, manganese 2.3% at 1500° F.
Iron 6.3%, manganese 1.3% at 1600° F.
Iron 5.4%, manganese 1.4% at 1800° F.

Increasing the concentration of the leaching acid increases the recovery of the vanadium, but does not have any marked effect on the solubility of the iron and manganese. For example, Samples of slag roasted at 1600° F. and leached with sulphric acid of different concentrations gave the following extractions:

5% acid: 67.7% vanadium, 5.4% iron, 1.25% manganese.
10% acid: 72.3% vanadium, 6.3% iron, 1.3% manganese.
27% acid: 76.5% vanadium, 5.7% iron, 1.8% manganese.
38% acid: 76.4% vanadium, 6.4% iron, 2.4% manganese.

The amount of sulphuric acid of the same concentration used for leaching the roasted slags exerts a marked influence not only on the vanadium extraction, but also on the solubility of the iron and manganese; for example:

When a slag was roasted at 1400° F. and leached with 10% sulphuric acid, conditions of leaching being the same for every leach except the amount of acid being increased, the extraction of vanadium, iron and manganese was:

|  | Percent V | Percent Fe | Percent Mn |
|---|---|---|---|
| Using 33.5 lbs. $H_2SO_4$ per lb. V in slag | 56.5 | 2.4 | 2 |
| Using 39.1 lbs. $H_2SO_4$ per lb. V in slag | 63.5 | 5.3 | 3.2 |
| Using 44.7 lbs. $H_2SO_4$ per lb. V in slag | 75.0 | 8.0 | 3.3 |
| Using 55.6 lbs. $H_2SO_4$ per lb. V in slag | 76.5 | 10.0 | 6.4 |

The increase in the solubility of the iron and manganese is, however, not large enough to interfere with a satisfactory separation of the vanadium from these solutions.

Other mineral acids such as hydrochloric or nitric acid can be used to attack the roasted slag for the purpose of extracting the vanadium. Higher concentration and larger quantities, however, are required to obtain a satisfactory vanadium extraction, with a tendency to increase the solubility of iron and manganese. Due to these conditions and the high initial cost of these acids, I prefer to use sulphuric acid, although the process need not be confined to the employment of this acid.

While examples given above apply directly to basic open hearth steel slags, other furnace slags such as those produced in the direct reduction of vanadium ores in the electric furnace, and also slags formed in smelting lead vanadate ores in the lead blast furnace lend themselves readily to extraction by this process. Analyses of typical vanadium-bearing slags are as follows:

|  | Basic open hearth steel slags | Electric furnace V-bearing slags | Lead furnace V-bearing slags |
|---|---|---|---|
| $V_2O_5$ | 2.89 | 1.09 | 10.70 |
| $SiO_2$ | 12.78 | 39.12 | 30.50 |
| $CaO$ | 39.53 | 30.91 | 20.40 |
| $MgO$ | 8.47 | 2.30 |  |
| $MnO$ | 11.32 | .19 |  |
| $FeO$ | 18.64 | 1.99 | 40.30 |
| $Al_2O_3$ | 0.83 | 21.92 |  |

When the electric furnace slag given above was pulverized and leached with 5% sulphuric acid, an extraction of only 13.8% of the vanadium present was obtainable. When, however, the slag was roasted at 1500° F. for 3 hours and leached with 5% sulphuric acid, an extraction of 65% was obtained.

Again, the above lead blast furnace slag obtained in smelting lead vanadate ores, when pulverized and roasted according to the prescribed procedure showed an extraction of 87% of its vanadium content in spite of the high iron content, as compared to an extraction of only 16% of the vanadium when raw unroasted slag was leached in 5% sulphuric acid.

The vanadium solutions obtained from the roasted vanadium-bearing slags by the preferred leaching process with sulphuric acid do not offer any difficulty in separating the vanadium from these solutions. The vanadium can be recovered as vanadium pentoxide or iron vanadate.

In the preferred process, the precipitation of the sulphuric acid leaching solutions is executed in two stages:

The first stage comprises the removal of the bulk of the sulphuric acid and iron by limestone and the second the precipitation by limestone and lime of the entire vanadium content; for example, 300 parts of roasted slag are leached with 10% sulphuric acid. The filtered leaching solution is partly neutralized with 30 parts of finely ground limestone. The resulting precipitate removes from the solution the bulk of the sulphuric acid as calcium sulphate and about 60% or more of the iron as a basic iron sulphate. 19 parts more limestone and 35 parts of slaked lime are added to the filtrate, which is agitated well and filtered. The precipitate contains the vanadium almost quantitatively.

The precipitate is leached by boiling with 55 parts sodium carbonate for the extraction of the vanadium. The first precipitate with limestone alone contains about 6% of the vanadium present in the leaching solution, while the balance of the vanadium is in the second precipitate. The extraction of the vanadium by the sodium carbonate leach of the second precipitate is about 85%.

Using this preferred procedure, the amount of sodium carbonate used for the extraction of the vanadium from the calcium precipitate is reduced about 50%. Whereas 33 parts of sodium carbonate are needed for extraction of one part of vanadium from the precipitate obtained by the combined limestone-lime precipitation, only 16 parts are necessary to extract one part vanadium from the precipitate obtained after the sulphuric acid and iron had been removed by precipitation with limestone alone.

The filtered alkaline extraction solution is evaporated and precipitated by the well known procedure of adding sulphuric acid to the hot solution to form vanadium pentoxide. The vanadium pentoxide so obtained analyzes 90% $V_2O_5$ and contains no objectionable impurities.

If it is desired to recover the vanadium as an iron vanadate from the sodium carbonate leaching solutions, the solutions are neutralized with sulphuric acid and ferrous sulphate added to complete precipitation of the vanadium present; for example, The final alkaline sodium carbonate leaching solution obtained from the sulphuric acid leach of 300 parts of roasted slag via precipitation according to the preferred process with limestone and limestone-lime, is neutralized with sulphuric acid and 12 parts of ferrous sulphate added. The precipitate is washed with water and analyzes when dried at 110 C., about 50% $V_2O_5$ and 34.2% FeO and does not contain any objectionable impurities. The precipitation of the vanadium by ferrous sulphate is almost quantitative.

Although I have described several examples of my process, it is to be understood that the invention is not limited thereto, but may be otherwise embodied or practiced within the scope of the following claims.

I claim:

1. The process of treating silicate furnace slags containing a minor amount of vanadium and a relatively larger amount of contaminant selected from the group consisting of iron, manganese and aluminum, which comprises comminuting the slag, roasting it in an oxidizing atmosphere at a temperature of about 1400° F. to 1800° F., and leaching the roasted slag with a mineral acid, the amount and concentration of the acid being such as to preferentially extract the vanadium, leaving such ordinarily easily soluble constituents as the oxides of iron, manganese, aluminum and silicon for the most part in the insoluble residue.

2. The process of treating silicate furnace slags containing a minor amount of vanadium and a relatively larger amount of contaminant selected from the group consisting of iron, manganese and aluminum, which comprises comminuting the slag, roasting it in an oxidizing atmosphere at a temperature of about 1400° F. to 1800° F., and leaching the roasted slag with sulphuric acid of a strength between 5 and 40% by weight, the amount of acid being such as to preferentially extract the vanadium, leaving such ordinarily easily soluble constituents as the oxides of iron, manganese, aluminum and silicon for the most part in the insoluble residue.

3. The process of treating silicate furnace slags containing a minor amount of vanadium and a relatively larger amount of contaminant selected from the group consisting of iron, manganese and aluminum, which comprises comminuting the slag, roasting it in an oxidizing atmosphere at a temperature of about 1400° F. to 1800° F., and leaching the roasted slag with sulphuric acid of a strength of about 10% by weight, the amount of acid being such as to preferentially extract the vanadium, leaving such ordinarily easily soluble constituents as the oxides of iron, manganese, aluminum and silicon for the most part in the insoluble residue.

4. The process of treating silicate furnace slags containing a minor amount of vanadium and a relatively larger amount of contaminant selected from the group consisting of iron, manganese and aluminum, which comprises comminuting the slag, roasting it in an oxidizing atmosphere at a temperature of at least 1400°F. for a time sufficient to render the contaminant relatively insoluble in mineral acid, and leaching the roasted slag with a mineral acid, the amount and concentration of the acid being such as to preferentially extract the vanadium, leaving such ordinarily easily soluble constituents as the exides of iron, manganese, aluminum and silicon for the most part in the insoluble residue.

5. The process of treating silicate furnace slags containing a minor amount of vanadium and a relatively larger amount of contaminant selected from the group consisting of iron, manganese and aluminum, which comprises comminuting the slag, roasting it in an oxidizing atmosphere at a temperature of at least 1400° F. for a time sufficient to render the contaminant relatively insoluble in mineral acid, and leaching the roasted slag with sulphuric acid of a strength between 5 and 40% by weight, the amount of acid being such as to preferentially extract the vanadium, leaving such ordinarily easily soluble constituents as the oxides of iron, manganese, aluminum and silicon for the most part in the insoluble residue.

6. The process of treating silicate furnace slags containing a minor amount of vanadium and a relatively larger amount of contaminant selected from the group consisting of iron, manganese and aluminum, which comprises comminuting the slag, roasting it in an oxidizing atmosphere at a temperature of at least 1400° F. for a time sufficient to render the contaminant relatively insoluble in mineral acid, and leaching the roasted slag with sulphuric acid of a strength of about 10% by weight, the amount of acid being such as to preferentially extract the vanadium, leaving such ordinarily easily soluble constituents as the oxides of iron, manganese, aluminum and silicon for the most part in the insoluble residue.

BRUNO MAYER.